US006277190B1

(12) United States Patent
Schulte et al.

(10) Patent No.: US 6,277,190 B1
(45) Date of Patent: Aug. 21, 2001

(54) USE OF ALCOHOLS AS ADDITIVES FOR PLASTER AND/OR MORTAR

(75) Inventors: Heinz-Guenther Schulte, Muelheim; Wolfgang Gress, Wuppertal; Ralf Neumann, Haan; Sarantis Moustakas, Krefeld, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/403,995

(22) PCT Filed: Apr. 20, 1998

(86) PCT No.: PCT/EP98/02321

§ 371 Date: Jan. 21, 2000

§ 102(e) Date: Jan. 21, 2000

(87) PCT Pub. No.: WO98/49114

PCT Pub. Date: Nov. 5, 1998

(30) Foreign Application Priority Data

Apr. 29, 1997 (DE) .............................................. 197 17 936

(51) Int. Cl.[7] .......................... C04B 16/00; C04B 24/02; B01J 31/00; B01J 20/22
(52) U.S. Cl. .......................... 106/802; 106/719; 106/724; 106/737; 106/774; 106/778; 106/819; 106/823; 502/401; 502/172
(58) Field of Search ................................ 106/719, 724, 106/737, 773, 774, 778, 802, 819, 823; 502/401, 172

(56) References Cited

U.S. PATENT DOCUMENTS

| 3,486,916 | 12/1969 | Cordon ................................. 106/90 |
| 4,421,675 | * 12/1983 | Sawicki ............................... 502/150 |
| 4,794,098 | * 12/1988 | Pohl et al. .......................... 502/172 |
| 5,176,752 | 1/1993 | Scheiner ............................. 106/737 |
| 5,681,787 | * 10/1997 | Seamans et al. ..................... 502/33 |
| 5,807,502 | 9/1998 | Wollenweber et al. ............. 252/321 |
| 5,895,802 | 4/1999 | Weichmann et al. .............. 525/480 |

FOREIGN PATENT DOCUMENTS

| 44 21 270 | 12/1995 | (DE) . |
| 44 34 010 | 3/1996 | (DE) . |
| 652 154 | 3/1979 | (SU) . |
| 950 703 | 8/1982 | (SU) . |
| WO95/35143 | 12/1995 | (WO) . |

OTHER PUBLICATIONS

Technologie der Baustoffe Handbuch (1990) p. 114, Müller et al.

* cited by examiner

Primary Examiner—Elizabeth D. Wood
(74) Attorney, Agent, or Firm—John E. Drach; Henry E. Millson, Jr.

(57) ABSTRACT

Mortars and plasters containing additives which are alcohols having from 8 to 72 carbon atoms adsorbed on solid supports, and processes for the preparation of the additives.

30 Claims, No Drawings

USE OF ALCOHOLS AS ADDITIVES FOR PLASTER AND/OR MORTAR

FIELD OF THE INVENTION

This invention relates to the use of alcohols containing 8 to 72 carbon atoms per molecule as additives for plasters and/or mortars. The alcohols are present in powder form, being adsorbed onto a solid support. This ensures that, besides other favorable properties, the open time in particular of the corresponding mortars is extended.

BACKGROUND OF THE INVENTION

Mortars (cf. for example Gerhard Stehno: "Baustoffe und Baustoff-prüfung", Springer Verlag, Vienna 1981, page 82) are understood in the building industry to be mixtures of aggregates, binders and water and, if desired, additives.

Plasters are different from mortars. Plasters are normally understood to be mixtures of aggregates and binders and optionally additives. Accordingly, plasters are substantially "dry" systems. Plasters are converted into mortars by stirring with water. In practice, plasters are normally stirred with water, i.e. converted into mortars, just before use.

The above-mentioned ingredients or functional components of plasters and the mortars obtainable from them by adding water are as follows:

The so-called aggregates are generally mineral aggregates (sands) with a maximum particle size of 4 mm. The function of the sand is to form a mineral framework in the mortar. By suitably selecting the sand, it is possible favorably to influence both the volume stability and the strength of the mortar. In most cases, natural sand is used, although artificial sands may also be used.

Binders are selected according to the required processability and the required properties of the hardened mortar. By mixing the binder with water, the individual aggregate particles are supposed to be coated and cemented together. In general, two types of binder are used. First, there are the mineral binders. Mineral binders are divided into air-curing binders which cure exclusively in air after the addition of water, and hydraulic binders which can cure both in air and in water after the addition of water. Depending on the nature of the mineral binder, the corresponding mortars are known as gypsum mortars, gypsum lime mortars, anhydrite mortars, anhydrite lime mortars, plaster and masonry binding mortars, cement mortars and magnesia mortars. Besides the mineral binders mentioned, organic binders are also used. In their case, the corresponding mortars are also known as synthetic resin mortars.

By incorporating additives, certain mortar properties, for example permeability to water, particularly good adhesion, workability, color etc., can be influenced or improved.

Mortars can be classified in various ways. Typically, mortars are classified according to
a) the type of binder used (for example cement mortar, lime mortar, lime cement mortar, gypsum mortar, etc.),
b) the application envisaged (for example masonry mortars, plaster mortars, Colgraut mortars, joint mortars, screed mortars, etc.) and
c) the hardening process (for example non-hydraulic mortars or hydraulic mortars).

The Following Observations Apply to Plaster Mortars:

Plasters are applied to walls and ceilings in one or more layers, according to requirements. Apart from the aesthetic appearance of the surface, plasters provide protection against the effects of weather (external plasters) and form a smooth surface for screeds and wallpapers (internal plasters); in steel-reinforced concrete ceilings and stairs and in steel stanchions, they protect the steel cores against fire and, where porous aggregates are used, afford protection against heat. Basically, internal and external plasters should be able to breath, i.e. should allow the exchange of moisture by vapor diffusion between the plastered components and the atmosphere. Plaster mortars are used for plasters containing mineral binders while coating materials (synthetic resin plasters) are used for plasters containing organic binders. Both can act in combination as a plaster system. Coating materials for the production of synthetic resin plasters often consist of organic binders in the form of dispersions or solutions and fillers in which most of the particles are larger than 0.25 mm in size. They are normally supplied in processable form.

A general problem with plaster mortars is that they dry out prematurely during processing. To prevent such premature drying out (which results in crack formation, etc.), for example under the effect of air and/or sunlight, it is normally proposed in the relevant literature to protect plasters by suitable measures. These include spraying with water, sunscreening for external plasters, closing the window openings in the case of internal plasters while allowing ventilation to evaporate the moisture (cf. Siefried Härig, Karl Günther, Dietmar Klausen, "Technologie der Baustoffe—Handbuch für Studium und Praxis", Verlag C. F. Müller, Karlsruhe 1990, page 114).

In recent years, so-called dispersion plasters which contain redispersible polymer powders as binders have acquired increasing significance. "Dispersion plasters" are so called because the corresponding binders are prepared from aqueous polymer dispersions which have been converted into a dry state, for example by spray drying. If a plaster containing such a binder is contacted with water, the polymers are redispersed, i.e. the mortar thus obtained now contains polymers as binder.

The increasing success of dispersion plasters is attributable inter alia to such advantages as better adhesion and elasticity and to their water-repellent character. However, in the plastering of relatively large surfaces, the open time of dispersion plasters is a critical factor, as already generally described above for plaster mortars. This is because, after drying accompanied by coalescence of the polymer dispersion, the resistance of the plaster to water reaches a first stage after which the plaster can no longer readily be dissolved with water. The consequences are visible starting points. The problem is greater, the more heavily textured the plaster (rubbing plasters, texture plasters).

U.S. Pat. No. 3,486,916 describes cement mixtures characterized by a delayed free water release rate. These mixtures are obtained by adding an aqueous emulsion of $C_{14-20}$ fatty alcohols which form an evaporation-inhibiting film on the surface of the cast objects.

WO 95/04008 describes a dry cement with a reduced tendency to exude lime under the influence of weathering, the hydraulic cement containing 0.01 to 3% by weight of at least one $C_{14-22}$ fatty alcohol.

SU 950 703 (Derwent Abstract 63154 K/26) describes mixtures of various fatty alcohols, hydrocarbons, soaps and fatty acid esters. These mixtures are used to protect the surface of freshly laid concrete against the over-rapid evaporation of water.

SU 652 154 (Derwent Abstract 88793 B/49) describes the pro-duction of concrete moldings. Freshly laid concrete is coated with a dilute aqueous solution of cetyl alcohol. This is said to reduce the water evaporation rate by a factor of 4 to 5. The fatty alcohol layer is subsequently removed.

DE-A-44 34 010 describes redispersible polymer powders containing amino-s-triazine/formaldehyde/sulfide condensates as effective protective colloids which are of importance in the spray drying of the corresponding polymer dispersions. According to page 3, lines 7 et seq., the redispersible polymer powders contain vinyl- or acrylate-based polymers as their principal component. The examples of suitable polymers mentioned include products of vinyl acetate, vinyl propionate, vinyl laurate, vinyl chloride, vinylidene chloride, straight-chain or branched vinyl esters containing 3 to 18 carbon atoms (versatates), acrylic and methacrylic monomers, more especially esters, and styrene and ethene which may be present in the form of homopolymers, copolymers, terpolymers and as graft polymers.

DE-A-44 21 270 describes aqueous fatty alcohol dispersions which contain $C_{10-28}$ fatty alcohols, anionic surface-active compounds and nonionic surface-active compounds. The aqueous dispersions in question are suitable as antifoam agents and as additives for dispersion-bonded plasters. According to page 5, lines 14 to 20, these aqueous fatty alcohol dispersions increase the open time of dispersion plasters. In addition, the tendency of dispersion plasters to develop cracks is distinctly reduced where these dispersions are used. A reduction in water absorption and hence an increase in the hydrophobicizing effect of the plasters are further advantages. Finally, the plasters also lend themselves to coating and have high permeability to water vapor. However, DE-A-44 21 270 discloses only aqueous dispersions containing inter alia fatty alcohols to increase the open time of dispersion plasters. Accordingly, DE-A-22 21 270 discloses fatty alcohols in dispersion form as open time extenders for dispersion plasters which are packaged as water-containing pastes.

SUMMARY OF THE INVENTION

The problem addressed by the present invention was to provide additives for plasters and/or mortars which would ensure that the mortars containing these additives, which are obtainable either by stirring the plasters containing the additives with water or by stirring the individual components (aggregates, binders and additives) with water, would be distinguished by an increase in their open time.

The problem stated above has been solved by special additives. These additives are alcohols in powder form, the alcohols which are adsorbed onto a solid support containing 8 to 72 carbon atoms per molecule and being branched or unbranched, saturated or unsaturated.

In the context of the invention, the term "alcohols" is understood to apply both to individual alcohols with a defined chain length and to mixtures of alcohols in the C-chain length range mentioned.

In the context of the present invention, the expression "powder form" is understood to mean that the alcohols, i.e. the solid supports coated with the alcohols, are present in a pourable or free-flowing powder form. It does not matter whether the powder feels slightly moist or not.

The additives according to the invention afford the following advantages: the drying time of the mortar system is extended. In this way, rubbing plasters can be textured even after a relatively long drying time and differences in the plaster textures—rubbed off at different times—are minimized. In addition, the so-called "water-repellent effect" characteristic of other commercially available hydrophobicizing agents does not occur where the additives according to the invention are used. However, the additives are capable of increasing the time which water coming from outside takes to penetrate. It has also been found that the use of the additives according to the invention does not cause any coating adhesion problems. Finally, the additives according to the invention distinctly reduce the tendency towards crack formation. Another advantage of using the additives according to the invention is that plaster systems prepared with them are flexible and can be applied and spread with little effort.

Disadvantages, such as accelerated cement reaction and reduced resistance (early water, UV, etc.), are not in evidence.

DESCRIPTION OF THE PREFERRED EMBODIMENTS

In a first embodiment, the present invention relates to the use of alcohols as additives for plasters and/or mortars. The additives are present in powder form, the alcohols being adsorbed onto a solid support. The chain length of the alcohols is in the range from 8 to 72 carbon atoms per molecule. As already mentioned, the alcohols may be saturated or unsaturated, linear or branched. In addition, they may be used either as individual species or in the form of mixtures with one another.

Basically, the choice of the solid support is not critical. However, a solid support to be used in accordance with the invention should be capable of optimally absorbing an aqueous alcohol dispersion so that, on the one hand, the water present is largely bound internally, leaving the outside substantially dry, and on the other hand the alcohols are adsorbed onto the surface and/or in zones near the surface. In preferred embodiments, therefore, the solid support should be porous and, in particular, should have medium to good porosity. In common usage, porosity is understood to be the property of the solid support to be provided with pores. Porous materials are often characterized by the so called pore volume. In this regard, the choice of a certain pore volume for porous solid supports is basically not critical. Accordingly, it is possible to use both supports with coarse pores and supports with fine pores (macropores, mesopores or micropores).

The use of porous materials as the support provides for an increase in the surface of the particles of the solid support and, hence, for a high adsorption capacity for the alcohols to be used in accordance with the invention. It follows from the various requirements mentioned that preferred solid supports are selected from the group of solid adsorbents. By definition, adsorbents are substances which, by virtue of their large surface, are capable of selectively concentrating certain substances at their surface to an extent which is greater, the more finely divided the adsorbent. Accordingly, porous substances are generally good adsorbents, as well-known to the expert.

Examples of suitable supports are silicas, silica gels (including molecular silica gels, colloidal or unformed silica of elastic to solid consistency with a loose to compact pore structure—silica being present in the form of highly condensed polysilicic acids), aluminium oxides, aluminium silicates, kaolin, chalk, microtalcum, barium sulfate, titanium white, zeolites and the like. According to the invention, particularly preferred supports are silicas, especially precipitated silicas.

In principle, the alcohols may be applied to the solid supports in various ways. For example, the alcohols may be applied to the solid support in liquid or molten form or may be sprayed onto the support. However, they may also be applied in the form of an aqueous dispersion. According to the invention, the production of the alcohols in powder form is preferred and is described hereinafter. The advantage is that, where supports of medium to high porosity, i.e. supports with an increased surface, are used, considerably more alcohol can be adsorbed onto the surfaces or into zones near the surface although, on the other hand, the water emanating from the alcohol dispersion can be effectively bound by the support.

The solid supports to be used for the production of the additives according to the invention are powder-form, pourable or free-flowing materials. Basically, the particle size of the support is not critical. Where the supports are used in mortars, however, at least 80% of the particles are preferably smaller than 1 mm in diameter. The diameter of at least 80% of the particles is preferably smaller than 1 mm, most of the remaining particles having a mean particle diameter of 1 to 3 mm. The morphology or shape of the particles is not a critical factor. The particles may be both spherical, rodlet-shaped or even amorphous. The particle size distribution may readily be determined by shaking a weighed Quantity of a powder-form solid support through a sieve with a defined mesh width (for example 1 or 3 mm) and determining the percentage of material retained by the sieve by differential weighing.

As already mentioned, the alcohols present in the additives according to the invention may be present as individual species or in the form of mixtures with one another. The alcohols may be saturated or unsaturated, linear or branched. Examples of particularly suitable classes of alcohols are fatty alcohols of natural origin containing 8 to 24 carbon atoms per molecule, derivatives of fatty alcohols, such as Guerbet alcohols and dimer and/or trimer alcohols, and finally oxoalcohols.

A preferred embodiment of the present invention is characterized by the use of fatty alcohols, preferably mixtures of fatty alcohols of natural origin. These mixtures may contain saturated and/or unsaturated fatty alcohols. Examples of suitable fatty alcohols are caprylic alcohol, pelargonic alcohol, capric alcohol, 1-undecanol, lauryl alcohol, 1-tridecanal, myristyl alcohol, 1-pentadecanol, palmitoleyl alcohol, 1-heptadecanol, stearyl alcohol, 1-nonadecanol, arachidyl alcohol, 1-heneicosanol, behenyl alcohol, 1-tricosanol, lignoceryl alcohol, oleyl alcohol, elaidyl alcohol, ricinoleyl alcohol, linoleyl alcohol, linolenyl alcohol, gadoleyl alcohol, arachidonyl alcohol, erucyl alcohol and brassidyl alcohol.

In another embodiment, Guerbet alcohols are used. Guerbet alcohols are compounds corresponding to general formula (I):

$$R^1—CH(CH_2OH)—R^2 \quad (I)$$

in which $R^1$ and $R^2$ independently of one another represent an alkyl group containing 6 to 12 carbon atoms, with the proviso that the total number of carbon atoms per molecule is in the range from 16 to 24. The Guerbet alcohols (I) are produced by synthesis methods known per se in organic chemistry. In addition, many Guerbet alcohols are commercially available.

In another embodiment, dimer and/or trimer alcohols are used. Dimer and trimer alcohols are alcohols which are derived from so-called dimer and trimer fatty acids by replacement of the COOH function by an OH function. Dimer fatty acids are known among experts to be carboxylic acids which can be obtained by oligomerization of unsaturated carboxylic acids, generally fatty acid mixtures, such as oleic acid, linoleic acid, erucic acid and the like. The oligomerization is normally carried out at elevated temperature in the presence of a catalyst, for example of clay. The products obtained are mixtures of various substances, the dimerization products predominating. However, certain percentages of higher oligomers, more particularly trimer fatty acids, are also present. In addition, trimer fatty acids also contain monomers or monobasic carboxylic acids from their production. Dimer fatty acids are commercially available products and are marketed in various compositions and qualities. According to the invention, it is preferred to use dimer diols emanating from dimer fatty acids which have a dimer content of at least 50% and preferably of at least 75% and in which the number of carbon atoms per dimer molecule is predominantly in the range from 36 to 44. Similarly to the dimer fatty acids, the trimer fatty acids are also oligomerization products of unsaturated fatty acids in which the percentage of trimers in the product predominates. Trimer fatty acids are also commercially available products. Dimer diols and trimer triols, which represent possible alcohols to be used in accordance with the invention, may be obtained for example by hydrogenation of dimer and trimer fatty acids. The hydrogenation reaction is normally carried out in the presence of copper- and/or zinc-containing catalysts in standard continuous pressure hydrogenation reactors with gas circulation.

In another embodiment, oxoalcohols are used. Oxoalcohols are synthetically produced alcohols. These alcohols, which are obtained in the so-called oxosynthesis, are mostly primary and branched. Examples of commercially available oxoalcohols are isooctyl, isononyl, isodecyl and isotridecyl alcohol.

The powder form of the alcohols is preferably produced by contacting a solid—and preferably porous—support with an aqueous dispersion of the alcohols and mixing the support and dispersion in mixers of the type typically used for producing powders.

Accordingly, the present invention also relates to a process for the production of alcohols in powder form which is characterized in that a solid support is contacted with an aqueous dispersion of alcohols containing 8 to 72 carbon atoms per molecule and the support and dispersion are mixed in mixers of the type typically used for producing powders, for example in a Lödige mixer. The aqueous alcohol dispersions used preferably have an alcohol content of 5 to 50% by weight, based on the dispersion as a whole. An alcohol content of 15 to 35% by weight is particularly preferred. The ratio by weight of alcohol dispersion to support is preferably adjusted to a value of 20:80 to 80:20. A ratio by weight of alcohol dispersion to support of about 70:30 is most particularly preferred.

The additives according to the invention on the one hand may be mixed with aggregates and binders to form ready-to-use plasters which are converted into the corresponding mortar by stirring with water immediately before use. On the other hand, the additives may be separately stored and only used immediately before preparation of the mortar.

For practical reasons, the first of these two alternatives is the more important. To prepare mortars from such plasters containing the additives according to the invention, the plasters are stirred with water and then left to ripen for a few minutes.

Accordingly, the present invention also relates to plasters containing aggregates, binders and additives which are characterized in that the additives are alcohols in powder form which are adsorbed onto a solid support, the alcohols containing from 8 to 72 carbon atoms per molecule, and to mortars obtainable by stirring the plasters with water.

In one preferred embodiment, the plasters contain the additives according to the invention in quantities of 0.01 to 10% by weight, based on the plaster as a whole. Quantities of 0.3 to 2% by weight are particularly preferred.

There are no restrictions on the aggregates and binders which may be used in the plasters and mortars according to the invention. Accordingly, any of the usual materials well-known to the expert may be used. Examples can be found in the preamble to the description under the heading "Prior Art". If desired, other typical additives besides the additives according to the invention may be added to the plasters or mortars.

The following Examples are intended to illustrate the invention without limiting in any way.

EXAMPLES

1. Production of an Additive According to the Invention

An aqueous dispersion of a mixture of natural fatty alcohols ("Loxanol 842 DP/6"; C-chain range 14–20; concentration of the fatty alcohols in the dispersions: 20% by weight; a product of Henkel KGAA, Düosseldorf) was mixed with silica ("Sipernat 22 S"; fine-particle, spray-dried and ground silica; manufacturer: Degussa AG, Frankfurt am Main) in a ratio by weight of 70:30 in a typical laboratory mixer for producing powders (Multi-Mix, Type MX 31). To this end, the silica was introduced first and the aqueous dispersion of the mixture of natural fatty alcohols was then added while stirring at the lowest speed setting and the whole was intensively stirred for about 20 to 30 seconds (medium stirring speed). The additive obtained in this way is referred to hereinafter as A-1.

Other silicas were similarly used as supports. The additive produced with silica FK 310 is referred to as A-2 and the additive produced with silica FK 320 as A-3. The additive produced with Sipernat 50 is referred to as A-4 and the additive produced with Sipernat 50 S as A-5.

Particulars of the silicas mentioned in the last paragraph can be found in the company publication "Fällungskieselsäuren und Silikate-Herstellung, Eigenschaften und Anwendungen (Precipitated Silicas and Silicates—Production, Properties and Uses)"; Degussa AG, Frankfurt am Main, Germany: Kiselsäure FK 310: very fine-particle silica with a BET surface of 650 m²/g; Kiselsäure FK 320: silica; Sipernat 50: spray-dried carrier silica with particularly high absorbency; Sipernat 50 S: obtained by grinding Sipernat 50 and thus of relatively small particle fineness.

2. Formulation of an Organosilcate Powder Plaster

A formulation containing an open time extender according to the invention (additive A-1) is shown by way of example in the following Table. Several performance tests were carried out on the basis of and in accordance with this formulation (cf. point 3).

| Component | Parts by weight | Function | Manufacturer |
|---|---|---|---|
| Portil K | 5.40 | Waterglass | Henkel KGaA |
| HYDROPALAT 760 | 0.30 | Wetting agent (flow aid) | Henkel KGaA |
| Mowilith LDM 2072 P | 4.20 | Dispersion | Hoescht AG |
| TEXAPON K12-96 | 0.12 | Air-entraining agent | Henkel KGaA |
| Zilosil 16 | 1.20 | Film forming agent | Omya GmbH |
| Tylose H 15000 YP2 | 0.25 | Thickener | Hoescht AG |

-continued

| Component | Parts by weight | Function | Manufacturer |
|---|---|---|---|
| FOAMASTER PD-1 | 0.70 | Powder defoamer | Henkel KGaA |
| Arbocel B 400 c | 1.20 | Fiber | Rettenmeier & Söhne |
| Bayertitan RFDI | 7.00 | Pigment | Bayer AG |
| Omyacarb 10 GU | 7.00 | Filler | Omya GmbH |
| Omyacarb 40 GU | 13.10 | Filler | Omya GmbH |
| Omyacarb 130 GU | 8.38 | Filler | Omya GmbH |
| Aluminiumoxid PS-6 | 1.00 | Filler | Martinswerk |
| Plastorit Naintsch 0.5 | 4.00 | Filler | Naintsch Mineralwerke |
| Calcilit 1.8–2.5 KA | 45.15 | Filler | Alpha Calcit Füllstoffe |
| Additiv A-1 | 1.00 | Open time extender | |

Manufacturers:
Henkel KGaA (Düsseldorf, Germany), Hoechst AG (Frankfurt, Germany), Omya GmbH (Cologne, Germany), Rettenmeier & Söhne (Ellwangen, Germany), Bayer AG (Leverkusen, Germany), Martinswerk (Bergheim, Germany), Naintsch Mineralwerk GmbH (Graz, Austria), Alpha Calcit Füllstoffe (Cologne, Germany).

3. Performance Tests 3.1. Open Time

The organosilicate powder plaster described in 2. was stirred with water to form a mortar. 23 Parts by weight of mixing water were added to 100 parts by weight of the above formulation and the mortar was allowed to ripen for 5 minutes after stirring. The mortar was then applied to a glass plate in a defined layer thickness. A needle (made of stainless steel, length 20 mm, diameter 1 mm) was then inserted into the wet coating material. The force which the needle required to move through the wet film at a defined speed (21.8 cm/h) was then measured. The results were recorded on a recorder.

This method is based on the principle whereby a lower force is required and hence recorded in the first (time) phase after application of the mortar to the glass plate. However, when the drying time begins, the force required increases considerably. The corresponding measuring points correlate exactly with the open time of the mortar used.

An open time of 27 minutes was measured for the mortar prepared as just described on the basis of the formulation described in 2. (as described, the organosilicate powder plaster contained 1.0 part by weight of additive A-1 according to the invention). By comparison, an open time of only 12 minutes was measured for a mortar which had also been prepared on the basis of the organosilicate powder plaster described in 2., but without an additive according to the invention. By increasing the amount of additive A-1 according to the invention in the powder plaster formulation mentioned, the open time was extended to as long as 32 minutes.

3.2. Crack Formation

After processing, the mortar based on the organosilicate powder plaster containing 1.0% by weight of additive A-1 (and a corresponding mortar with half the content of additive A-1 according to the invention) showed no cracks. By contrast, the corresponding mortar without additive A-1 according to the invention showed slight but clearly visible crack formation.

3.3. Hydrophobicization

Drops of water colored with methylene blue were applied by pipette to a paint film. The time the water took to penetrate into the film was then measured. In the case of the sample prepared on the basis of the mortar which did not contain additive A-1 according to the invention, the water penetrated directly into the film. The water penetrated through to the substrate, i.e. to the glass plate. By contrast, in the case of the samples prepared on the basis of the formulation containing additive A-1 according to the invention, the water spread over the surface of the film. Accordingly, the penetration time was increased and the depth of penetration reduced. The penetration time was 5 seconds in the case of the sample without A-1 and between 60 and 135 seconds in the case of the A-1-containing samples (depending on the concentration of the additive A-1). The corresponding concentration range of additive A-1 in the organosilicate powder plaster on which the mortar was based was in the range from 0.5 to 2.0% by weight.

3.4. Other Additives

The advantages of using additive A-1, as described in 3.1 to 3.3, were also observed where additives A-2 to A-5 according to the invention were used.

What is claimed is:

1. In a plaster or mortar, the improvement wherein the plaster or mortar contains an open time-enhancing quantity of an additive in powder form comprising a solid support onto which is adsorbed at least one alcohol having from 8 to 72 carbon atoms, wherein the solid support is at least one support selected from the group consisting of silicas, silica gels, aluminum oxides, aluminum silicates, kaolin, chalk, microtalcum, barium sulfate, titanium white, and zeolites.

2. The plaster or mortar of claim 1 wherein the solid support is silica.

3. The plaster or mortar of claim 2 wherein the silica is precipitated silica.

4. The plaster or mortar of claim 1, wherein the alcohol is at least one alcohol selected from the group consisting of a fatty alcohol containing from 8 to 24 carbon atoms, a Guerbet alcohol containing from 16 to 24 carbon atoms, a dimer alcohol, a trimer alcohol, and an oxoalcohol.

5. The plaster or mortar of claim 1 wherein the particle size of the solid support is such that at least about 80% of the particles are smaller than 1 mm in diameter.

6. The plaster or mortar of claim 1 wherein the at least one alcohol is at least one fatty alcohol.

7. The plaster or mortar of claim 6 wherein the at least one fatty alcohol is a mixture of fatty alcohols of natural origin.

8. The plaster or mortar of claim 6 wherein the alcohol is a Guerbet alcohol of the formula $R^1$—$CH(CH_2OH)$—$R^2$ wherein $R^1$ and $R^2$ independently represent a $C_{6-12}$ alkyl group, with the proviso that the total number of carbon atoms is from 16 to 24.

9. The plaster or mortar of claim 4 wherein the alcohol is a dimer alcohol mixture having a dimer content of at least about 75% and contains predominantly dimer alcohols having from 36 to 44 carbon atoms.

10. The plaster or mortar of claim 1 wherein the additive is made by contacting the solid support with an aqueous dispersion of the at least one alcohol.

11. The plaster or mortar of claim 10 wherein the aqueous dispersion contains from about 5 to about 50% by weight of alcohol.

12. The plaster or mortar of claim 10 wherein the ratio by weight of alcohol dispersion to solid support is from about 20:80 to about 80:20.

13. A process for the preparation of alcohols in powder form comprising the steps of
A) contacting a porous solid support with an aqueous dispersion of at least one alcohol containing from 8 to 72 carbon atoms; and
B) mixing the porous solid support and the aqueous dispersion to produce a powder; wherein the alcohol is adsorbed onto the porous solid support, and the water in the aqueous dispersion is bound by the porous solid support;
wherein the porous solid support is at least one porous solid support selected from the group consisting of silicas, silica gels, aluminum oxides, aluminum silicates, kaolin, chalk, microtalcum, barium sulfate, titanium white, and zeolites; and wherein the at least one alcohol is selected from the group consisting of fatty alcohols, Guerbet alcohols, dimer alcohols, trimer alcohols, and oxoalcohols.

14. The process of claim 13 wherein the aqueous dispersion has an alcohol content of from about 5 to about 50% by weight based on the weight of the dispersion.

15. The process of claim 13 wherein the ratio by weight of aqueous dispersion to solid support is in the range of from 20:80 to 80:20.

16. The process of claim 15 wherein said ratio is about 70:30.

17. A plaster comprising
a) at least one aggragate;
b) at least one binder; and
c) an open time-enhancing quantity of an additive in powder form comprising a solid support onto which is adsorbed at least one alcohol having from 8 to 72 carbon atoms, wherein the solid support is at least one support selected from the group consisting of silicas, silica gels, aluminum oxides, aluminum silicates, kaolin, chalk, microtalcum, barium sulfate, titanium white, and zeolites.

18. The plaster of claim 17 wherein component c) is present in from about 0.3 to about 2.0% by weight, based on the weight of the plaster.

19. The plaster of claim 17 wherein the solid support is silica.

20. The plaster of claim 19 wherein the silica is precipitated silica.

21. The plaster of claim 17 wherein the alcohol is at least one alcohol selected from the group consisting of a fatty alcohol containing from 8 to 24 carbon atoms, a Guerbet alcohol containing from 16 to 24 carbon atoms, a dimer alcohol, a trimer alcohol, and an oxoalcohol.

22. The plaster of claim 17 wherein the particle size of the solid support is such that at least about 80% of the particles are smaller than 1 mm in diameter.

23. The plaster of claim 17 wherein the at least one alcohol is at least one fatty alcohol.

24. The plaster of claim 23 wherein the at least one fatty alcohol is a mixture of fatty alcohols of natural origin.

25. The plaster of claim 17 wherein the alcohol is a Guerbet alcohol of the formula $R^1$—$CH(CH_2OH)$—$R^2$ wherein $R^1$ and $R^2$ independently represent a $C_{6-12}$ alkyl group, with the proviso that the total number of carbon atoms is from 16 to 24.

26. The plaster of claim 17 wherein the alcohol is a dimer alcohol mixture having a dimer content of at least about 75% and containing predominantly dimer alcohols having from 36 to 44 carbon atoms.

27. The plaster of claim 17 wherein the additive is made by contacting the solid support with an aqueous dispersion of the at least one alcohol.

28. The plaster of claim 27 wherein the aqueous dispersion contains from about 5 to about 50% by weight of alcohol.

29. The plaster of claim 27 wherein the ratio by weight of alcohol dispersion to solid support is from about 20:80 to about 80:20.

30. A mortar obtained by mixing the plaster of claim 17 with water.

* * * * *